United States Patent [19]
Steeby et al.

[11] Patent Number: 5,729,110
[45] Date of Patent: Mar. 17, 1998

[54] METHOD FOR CONTROLLING AN ELECTRONIC X-Y SHIFTING MECHANISM FOR A VEHICLE TRANSMISSION

[75] Inventors: Jon A. Steeby, Schoolcraft; Bruce A. Vincent, Kalamazoo; John M. Nowicke, Marshall; Daniel P. Janecke, Kalamazoo; Leo A. Kominek, Portage, all of Mich.

[73] Assignee: Eaton Corporation, Cleveland, Ohio

[21] Appl. No.: 541,837

[22] Filed: Oct. 10, 1995

[51] Int. Cl.⁶ ................................................. G05B 11/20
[52] U.S. Cl. ........................ 318/599; 388/811; 364/424.08
[58] Field of Search ..................................... 318/560, 567, 318/599, 600–603, 615, 626; 388/804, 811, 819, 829, 432, 434; 364/423.098, 424.08

[56] References Cited

U.S. PATENT DOCUMENTS

| | | | |
|---|---|---|---|
| Re. 34,260 | 5/1993 | Markyvech et al. | 74/335 |
| 4,873,881 | 10/1989 | Edelen et al. | 74/336 R |
| 4,928,544 | 5/1990 | Markyvech et al. | 74/335 |
| 5,281,902 | 1/1994 | Edelen et al. | 318/632 |
| 5,305,240 | 4/1994 | Davis et al. | 364/571.01 |
| 5,315,218 | 5/1994 | Fortune et al. | 318/54 |
| 5,325,029 | 6/1994 | Janecke et al. | 318/561 |
| 5,481,170 | 1/1996 | Edelsen et al. | 318/650 |

Primary Examiner—David S. Martin
Attorney, Agent, or Firm—Loren H. Uthoff, Jr.; Howard D. Gordon

[57] ABSTRACT

A control strategy for an electronically controlled X-Y shifting mechanism for a vehicle transmission which takes advantage of the extra supply voltage available on European vehicles while maintaining commonality with U.S. shifter systems. A variable voltage pulse width modulated duty cycle percentage is maintained at or below a 50% nominal value to make the 24V source appear as a 12V source, allowing commonality in X-Y shifting mechanism hardware and basic control algorithms for both 12V and 24V vehicle systems. However, this percentage is increased to greater than the nominal 50% limit when the available supply voltage drops below 24V, as well as between an initial movement of the shift finger and engagement of the finger with a shift block, in order to provide faster motor acceleration to obtain top speeds quicker and during low force but top speed movement conditions.

5 Claims, 4 Drawing Sheets

METHOD FOR CONTROLLING AN ELECTRONIC X-Y SHIFTING MECHANISM FOR A VEHICLE TRANSMISSION

BACKGROUND AND SUMMARY OF THE INVENTION

The present invention relates generally to electronically controlled transmission systems and, more particularly, to a computer controlled method for optimizing the pulse width modulation (PWM) duty cycle of the motor drive signals in an electrically actuated X-Y shifting mechanism.

Electrically actuated X-Y shifting mechanisms for effecting change gear shifts in automated mechanical transmissions are well known in the art. See for example, U.S. Pat. Nos. 4,873,881 and 5,305,240, assigned to the assignee of the present invention, and hereby incorporated by reference. Such mechanisms typically include a plurality of substantially parallel, spaced-apart, axially movable shift rails, each of which carry a shift fork which is associated with a positive clutch mechanism for selectively engaging or disengaging a first or second gear to a shaft. Typically, shifting of the transmission is accomplished by selecting a shift rail by moving a shift finger axially or pivotally along an X—X axis into alignment with a shift block carried by the selected shift rail. Then the selected shift rail is moved to shift gears by axially moving or pivoting the shift finger to apply a force to the shift block in the direction of an axis Y—Y transverse to axis X—X. The shift finger is driven by electric motors under the control of a microprocessor based control system using a pulse width modulated duty cycle on an input signal typically obtained from the vehicle power supply.

Transmission systems employing this type of X-Y shifter are sold both in the United States, wherein a standard 12 volt (12V) supply voltage is provided, and in Europe wherein a 24V supply is standard. In order to minimize the expenses associated with producing two different hardware and software in order to accommodate the voltage supply differences in the United States and Europe, it would be advantageous to provide an X-Y shifter which could operate in either environment with as few differences as possible.

In order to maintain commonality between electronically controlled transmission systems of this type in the United States, which typically have an available 12V supply voltage, and those in Europe which typically have 24V available, the X-Y shifter for European transmissions according to the teachings of the present invention is designed to effectively utilize only 12 of the available 24 volts. Given a sufficiently short control loop time, employing a fixed 50% duty cycle limitation on the PWM in the European transmissions makes the 24V source appear as a 12V source. In this regard, common mechanical and electromechanical components such as motors and other hardware can be utilized both in the U.S. and Europe, with only a minor variation in software necessary to implement the European PWM limitation.

However, under certain conditions the extra voltage available in Europe can be advantageous to optimum operation of the X-Y shifter. For example, when the available input power drops below 24V, the fixed 50% duty cycle limitation may cause the European shifter to unnecessarily suffer the same low voltage as a United States system dropping below 12V. European systems to be operated in this manner would fail to take advantage of a higher available voltage when fast shift situations arise. In such instances the additional voltage would enable faster movement of the shift finger to the next gear engagement position.

Therefore, there exists a need to provide an X-Y shifter having an available 24V supply voltage with the advantage of this higher voltage in certain conditions. However, when the shift finger is about to engage the next shift block, or when engaging forces are otherwise present, it is advantageous to return to the 50% nominal duty cycle limitation in order to limit mechanical wear and finger breakage as well as to stay within the various component ratings.

The present invention provides a method for taking advantage of this extra available voltage by momentarily adjusting the duty cycle on the pulse width modulation to greater than the nominal 50% in certain circumstances. These circumstances can include situations where the available voltage drops below 24V, to provide faster motor acceleration in order to obtain top speeds quicker and during low force but top speed movement conditions. These exceptions to the fixed 50% PWM limitation utilized in European X-Y shift mechanisms provide enhanced transmission performance while maintaining current levels of commonality with U.S. systems.

These and other features and advantages of the present invention will become apparent upon review of the following description, taken in conjunction with the accompanying drawings.

DETAILED DESCRIPTION OF THE PREFERRED EMBODIMENT

Figure 1:
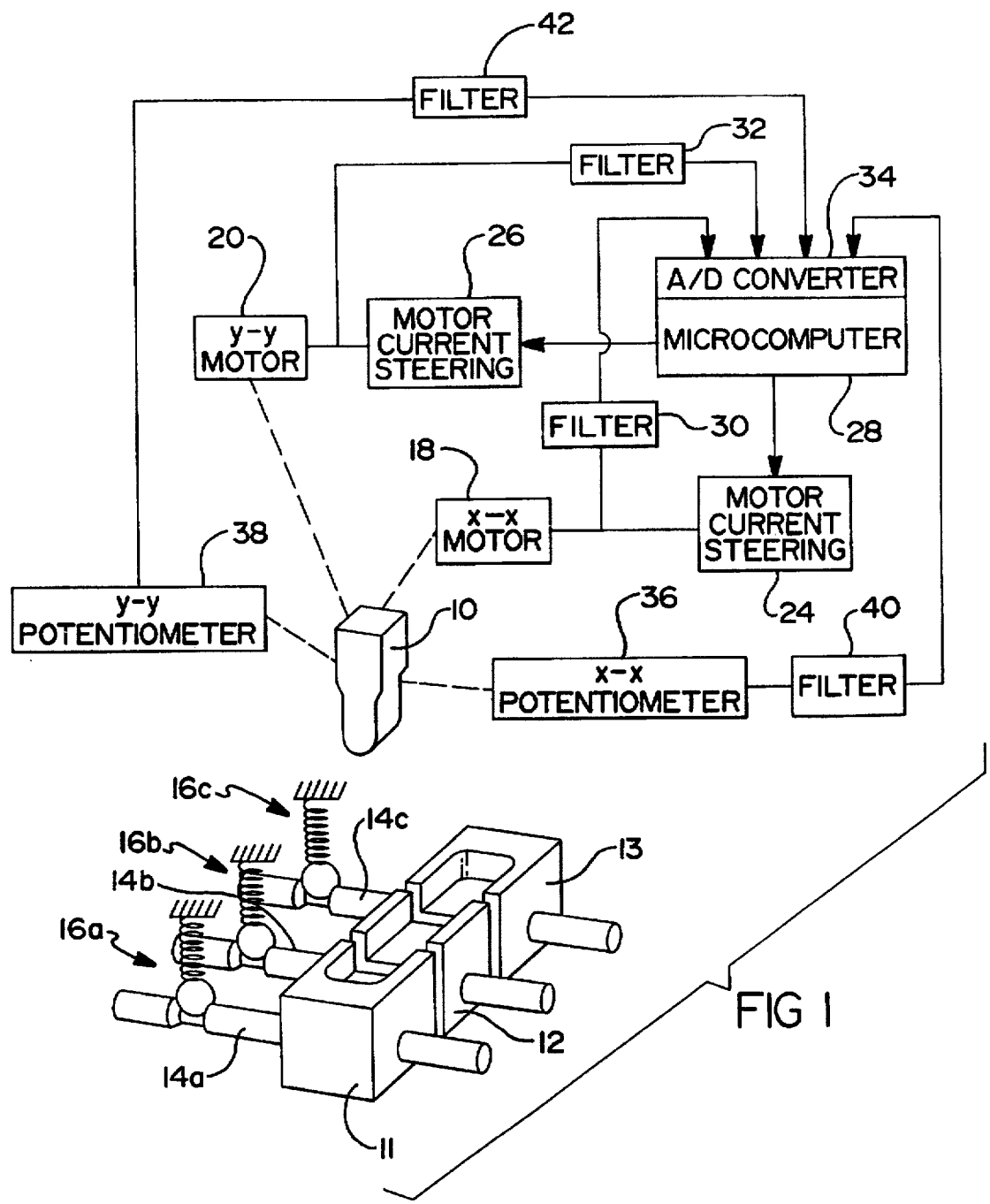
FIG. 1 is a schematic perspective view of a portion of an X-Y shifter showing the shift rails and the shift blocks, as well as a block diagram of the control system for positioning the shift finger.

Turning now to the drawings and more specifically to FIG. 1, portions of an X-Y shifter such as disclosed in the aforementioned patents are shown, including a shift finger 10 which is adapted to selectively contact inner walls of shift blocks 11, 12, and 13. The shift blocks 11, 12 and 13 are respectively mounted on shift rails 14a, 14b and 14c, each of which has a detent position determined by detent mechanisms generally designated 16a, 16b and 16c. Finger 10 is coupled through appropriate mechanisms (not shown) to electric motors 18 and 20 which are adapted to move the finger in the X—X and Y—Y directions, respectively, as explained in greater detail in the referenced patents. Alternatively, a single motor and appropriate clutch and drive mechanisms may be used to selectively move the finger along the X—X and Y—Y axes.

Motors 18 and 20 are supplied with a variable duty cycle pulse width modulated (PWM) voltage through steering logic 24 and 26, under the control of a microcomputer 28. The supplied voltage produces a current at motors 18 and 20 which is measured and filtered at 30 and 32, digitized by analog to digital converter 34 and input to microcomputer 28. The microcomputer is programmed to compare the measured current with a desired current and any deviation or error in the measured current is corrected by varying the duty cycle percentage.

To provide microcomputer 28 with information indicative of the position of shift finger 10 with respect to shift blocks 11, 12 and 13, the position of finger 10 along the X—X and Y—Y axes is sensed by potentiometers 36 and 38 which produce an output of from 0–5 volts over the range of shift finger movements. The signals output by potentiometers 36 and 38 are filtered at 40 and 42, digitized and input back to microcomputer 28. This information is used to provide closed loop control as well as in circumstances where it is necessary to be able to detect or anticipate the position of shift finger 10. Through steering logic 24 and 26, microcomputer 28 controls the direction of motor rotation, and, through duty cycle variation, controls the output torque and speed of the motors. Closed loop control of the current supplied to the motor as well as closed loop control of the position of the shift finger 10, permit the finger to be controllably driven into contact with the inner walls of the blocks 11–13.

While the control strategy of the present invention will be described with respect to a transmission having an X-Y shifter of this general type, it should become readily apparent that the invention is equally well suited to transmission systems of varying configurations wherein a nominal voltage limitation is required on the input power. Motors 18 and 20 in this exemplary embodiment have a 24V supply and a nominal 50% limit but these numbers may differ widely depending upon the configuration of the particular X-Y shifter and the conditions under which it is operated.

Figure 2:
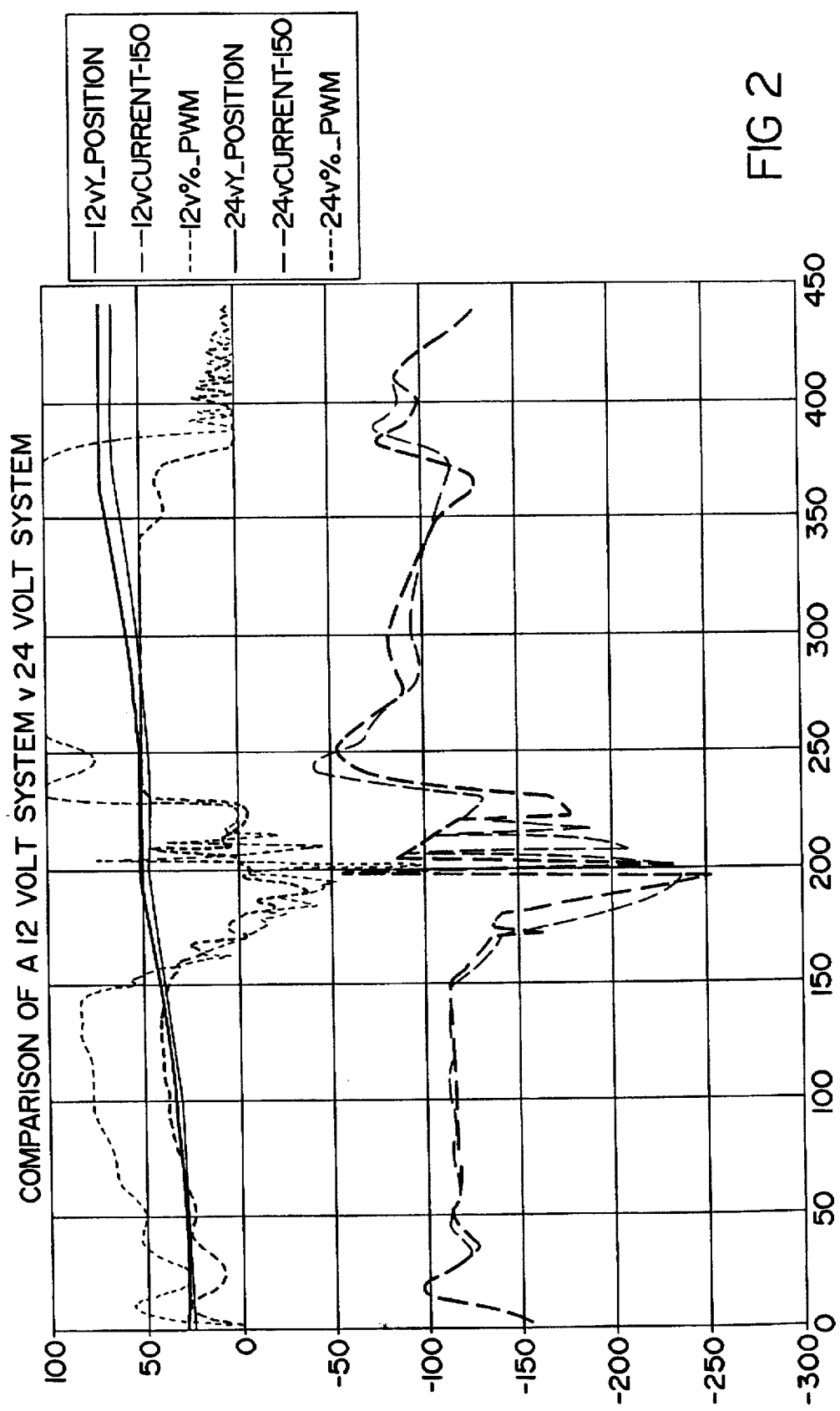
FIG. 2 is a graphical comparison of critical data collected while controlling an X-Y shift mechanism provided in accordance with the present invention with a 12 v system and with a 24 v system on a same rail shift (same X—X position).
Figure 3:
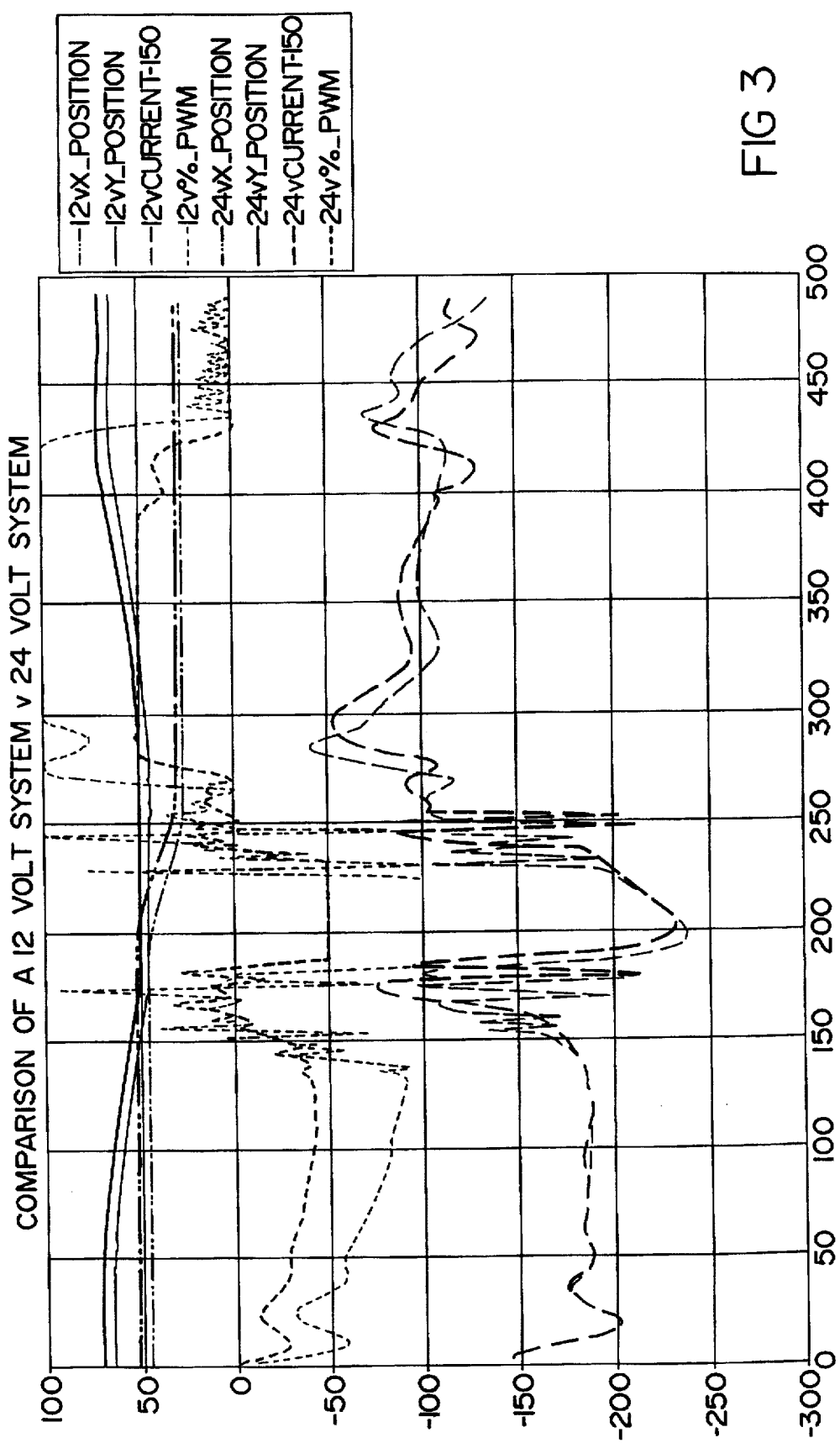
FIG. 3 is a graphical comparison similar to FIG. 2 illustrating the same comparisons for a rail change shift.

X-Y shift mechanism performance significantly equivalent to that achieved with a 12 volt vehicle system (in terms of positioning accuracy, speed, force and current levels) can be attained with a 24 volt vehicle system using a motor designed for 12 volt systems by making the following calibration changes in the software control algorithms: limit the saturation pulse width modulation level to 50% and divide by two the proportional and differential control constants for standard PD control of position and current levels. Comparisons with the same shift mechanism controlled using this strategy on both a 12 volt and 24 volt system are illustrated in the graphs of FIGS. 2 and 3. This strategy provides distinct advantages in that it allows the same X-Y shift mechanism hardware to be utilized with the same basic control algorithms for both 12 and 24 volt system applications.

Figure 4:
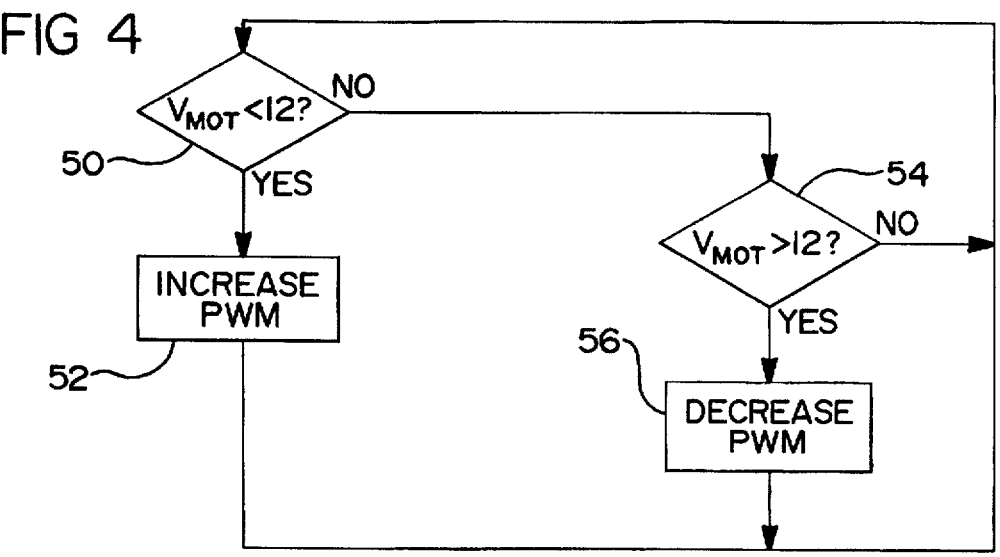
FIG. 4 is a flow chart illustrating operation of the present control strategy to account for situations when the available system supply voltage drops below 24 volts.

A flow chart which illustrates the present strategy for controlling the voltage applied to motors 18 and 20 during periods of input power reduction is shown in FIG. 4. This strategy is preferably implemented in software as a loop which may be called periodically by a main control program running in microcomputer 28, or, alternately, may be implemented in any other fashion known by those having skill in the art. The control loop begins at diamond 50 with the determination of whether the effective instantaneous available voltage to motors 18 and/or 20 with the PWM duty cycle limitation applied (represented herein as $V_{MOT}$) is less than a predetermined voltage, e.g. 12 volts. This determination can be made in any of a variety of ways, preferably within microcomputer 28. If $V_{MOT}$ is less than the target voltage of 12V, the pulse width modulation duty cycle is increased at block 52 until $V_{MOT}$ is no longer below 12 volts. This is preferably accomplished by increasing the PWM percentage immediately to 100% but may alternately be done in any other suitable manner such as by increasing this percentage to another value or over a period of time.

When the voltage applied to the motor is above or equal to 12 volts, the determination is made at diamond 54 as to whether this voltage has been raised to more than 12 volts. If so, the PWM duty cycle is decreased at block 56, in the presently preferred embodiment, back down to a nominal limit of 50%. It should be readily apparent to one of skill in the art, however, that there are a wide variety of methods by which this control strategy can be implemented to achieve the desired result of maintaining a substantially constant 12V supply. For example, the supply voltage could be measured at the source, prior to application of the PWM limitation, and the appropriate adjustment made. Alternately, the same strategy could be accomplished in an analogous manner utilizing another system parameter such as current.

Figure 5:
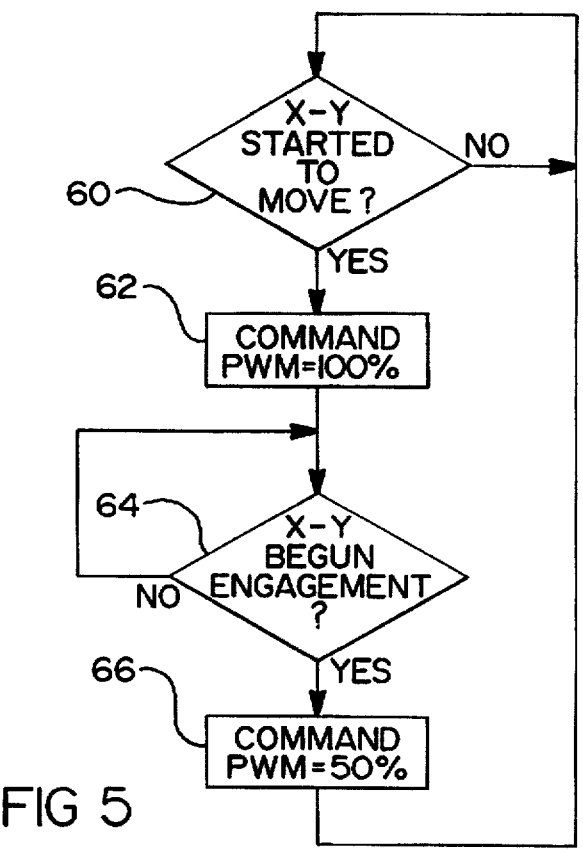
FIG. 5 is a flow chart similar to FIG. 4 which illustrates the present strategy for controlling the finger driving motors during the time period between an initial shifter movement and a point of engagement between the shift finger and a shift block.

Turning now to the flow chart of FIG. 5, a similar control loop is illustrated for purposes of providing maximum shift performance while substantially maintaining a nominal 12V motor input voltage. Beginning at diamond 60, the determination is made as to whether finger 10 of the X-Y shifter has begun an initial movement, such as from a neutral position or away from one engaged gear position and toward a next. This determination is typically made utilizing potentiometers 36 and 38 to sense the position of shift finger 10, but could alternately be made in any other suitable fashion. (See, for instance, U.S. Pat. No. 5,325,029 assigned to the assignee of the present invention and incorporated herein by reference).

Once an initial movement of finger 10 has been detected, the PWM is increased at 62, preferably to 100% although this percentage may vary, in order to provide additional power to drive motors 18 and 20 and thereby achieve a quicker shift. (See referenced U.S. Pat. No. 5,325,029). The duty cycle percentage preferably remains above the nominal limit until X-Y engagement between shift finger 10 and an inner wall of one of shift blocks 11, 12 or 13, is detected (or even anticipated) at diamond 64. Once this initial engagement is detected, or alternately determined to be imminent, the duty cycle percentage is adjusted back down to the nominal percentage limit at 66. By controlling this duty cycle to achieve faster shifts while maintaining a conservative 12V maximum voltage in engaged situations, the present transmission system gains performance while minimizing mechanical problems, finger breakage and wear and tear on the motors. Like that above, this control strategy can also be implemented with various modifications, such as measuring and adjusting the current amplitude in the input power and motor control signals.

This method is preferably implemented in software in order to provide maximum commonality between U.S. and European X-Y shifter systems and to provide an adjustable means to vary the duty cycle. The interaction between the control loops shown in FIGS. 4 and 5 with the main X-Y shifter control program can be fashioned in any suitable manner commonly known to those of skill in the art.

The foregoing discussion discloses and describes an exemplary embodiment of the present invention. One skilled in the art will readily recognize that various changes and modifications can be made thereto without departing from the spirit and scope of the present invention as defined by the following claims.

What is claimed is:

1. A method for adaptively controlling the voltage applied to an electronically actuable X-Y shifting mechanism for a vehicle transmission wherein said shifting mechanism includes a shift finger movable by motor means into and out of engagement with at least one shift block, said engagement of said finger with said block effecting gear changes in said transmission, said motor means being driven by a control signal, said motor control signal being substantially at or below a preferred voltage level, said method comprising the steps of:

receiving an electrical input signal from a power supply, said input signal being substantially at a nominal input voltage;

applying a duty cycle to said input signal, said duty cycle having a nominal duty cycle percentage equal to the ratio of said preferred motor control signal voltage level to the nominal voltage of said electrical input signal;

identifying an initial movement of said shift finger;

upon said identification raising said duty cycle percentage above said nominal duty cycle percentage level;

identifying a position of said shift finger wherein said shift finger is about to engage another said shift block; and returning said duty cycle percentage to said nominal duty cycle percentage.

2. The method of claim 1 wherein said motor control signal nominal voltage is 12 volts and said input signal voltage is 24 volts.

3. The method of claim 1 wherein said duty cycle is produced by pulse width modulating said input signal.

4. A method for adaptively controlling the voltage applied to an electronically actuable x-y shifting mechanism for a vehicle transmission wherein said shifting mechanism includes a shift finger movable by motor means into and out of engagement with at least one shift block, said engagement of said shift finger with said block effecting gear changes in said transmission, said motor means being driven by a control signal, said motor control signal being substantially at or below 12 volts, said method comprising the steps of:

receiving an electrical input signal from a power supply, said input signal being substantially at 24 volts;

applying a duty cycle to said input signal, said duty cycle having a nominal percentage equal to the ratio of said motor control signal voltage to the voltage of said input signal;

identifying an initial movement of said shift finger;

upon said identification raising said duty cycle percentage above said nominal percentage;

identifying a position of said shift finger wherein said shift finger is about to engage another shift block; and returning said duty cycle percentage to said nominal percentage.

5. The method of claim 4 further including the step of raising said duty cycle percentage above said nominal percentage whenever said input signal voltage drops below 24 volts.

* * * * *